(12) United States Patent
Osswald et al.

(10) Patent No.: US 8,085,670 B2
(45) Date of Patent: Dec. 27, 2011

(54) METHOD AND SYSTEM FOR ORIGINATING CONNECTIVITY FAULT MANAGEMENT (CFM) FRAMES ON NON-CFM AWARE SWITCHES

(75) Inventors: John Osswald, Northbridge, MA (US); Michael Poon, Westford, MA (US)

(73) Assignee: Nortel Networks Limited, Mississauga, Ontario (CA)

( * ) Notice: Subject to any disclaimer, the term of this patent is extended or adjusted under 35 U.S.C. 154(b) by 1518 days.

(21) Appl. No.: 11/313,637

(22) Filed: Dec. 21, 2005

(65) Prior Publication Data

US 2007/0140126 A1    Jun. 21, 2007

(51) Int. Cl.
*G01R 31/08* (2006.01)
(52) U.S. Cl. ............... 370/236.2; 370/223; 370/236.1; 370/242; 709/221
(58) Field of Classification Search ........... 370/216, 370/236.2–252, 352, 432, 392; 709/221
See application file for complete search history.

(56) References Cited

U.S. PATENT DOCUMENTS

| | | | |
|---|---|---|---|
| 5,974,046 A * | 10/1999 | Kim et al. ................ | 370/241.1 |
| 6,894,980 B1 * | 5/2005 | Pugaczewski et al. ....... | 370/242 |
| 7,016,947 B1 * | 3/2006 | Ah Sue .................. | 709/221 |
| 7,688,742 B2 * | 3/2010 | Sridhar et al. ............ | 370/241.1 |
| 2004/0160895 A1 * | 8/2004 | Holmgren et al. .......... | 370/223 |
| 2005/0099949 A1 * | 5/2005 | Mohan et al. ............. | 370/236.2 |
| 2005/0249119 A1 * | 11/2005 | Elie-Dit-Cosaque et al. | 370/236 |
| 2005/0249124 A1 * | 11/2005 | Elie-Dit-Cosaque et al. | 370/242 |
| 2006/0056414 A1 * | 3/2006 | Elie-Dit-Cosaque et al. | 370/392 |
| 2006/0153220 A1 * | 7/2006 | Elie-Dit-Cosaque et al. | 370/432 |
| 2006/0159008 A1 * | 7/2006 | Sridhar et al. ............ | 370/216 |
| 2007/0115837 A1 * | 5/2007 | Elie-Dit-Cosaque et al. | 370/242 |

OTHER PUBLICATIONS

Elie-Dit-Cosaque et al, Remote Access Link fault for 802.1ag, May 17, 2007, Alcatel.*
Elie-Dit-Cosaque et al, Remote Access Link fault Apr. 15, 2004, Alcatel.*
Dinesh Mohan, Ethernet OAM Update Overview & Technical Aspect, May 18, 2004, Nortel.*

* cited by examiner

*Primary Examiner* — Aung S Moe
*Assistant Examiner* — Vincelas Louis
(74) *Attorney, Agent, or Firm* — David A. Dagg

(57) ABSTRACT

A system for originating connectivity fault management (CFM) frames on non-CFM aware switches is disclosed. In the disclosed system, an OAM (Operations Administration and Management) proxy networking device connected to a core Ethernet network operates with one or more CPE (Customer Premises Equipment) devices to which it is communicably connected to support CFM out to the CPE devices without requiring that the CPE devices themselves implement CFM functionality. The OAM proxy networking device generates Connectivity Check (CC) frames, Loopback reply frames, and Linktrace reply frames for MEPs (Maintenance End Points) or MIPs (Maintenance Intermediate Points) contained in communication ports on the CPEs. These CFM frames generated by the OAM proxy networking device are then sent within messages from the OAM proxy networking device to the appropriate CPE. When the CPE device receives a message from the OAM proxy networking device containing one of these CFM frames, it checks the operability of a communication port indicated by the message. If the port is operable, the CPE device extracts the CFM frame from the message and originates it through the OAM proxy networking device into the core Ethernet network. The OAM proxy networking device further operates to process Connectivity Check frames received from the core Ethernet network and addressed to the CPE devices by maintaining an MEP connectivity database. As a result, these received Connectivity Check frames are dropped without forwarding to the CPE devices.

16 Claims, 5 Drawing Sheets

METHOD AND SYSTEM FOR ORIGINATING CONNECTIVITY FAULT MANAGEMENT (CFM) FRAMES ON NON-CFM AWARE SWITCHES

FIELD OF THE INVENTION

The present invention relates generally to fault management in networking devices, and more specifically to a method and system for originating connectivity fault management (CFM) frames on non-CFM aware switches.

BACKGROUND OF THE INVENTION

As it is generally known, Operations Administration and Management (OAM) is a standard term referring to tools used to monitor and troubleshoot a network. OAM for Ethernet networks is being standardized in IEEE 802.1ag under the name "Connectivity Fault Management" (CFM), and in ITU-T SG13 under the name "OAM Functions and Mechanisms for Ethernet based networks".

Ethernet CFM defines a number of proactive and diagnostic fault localization procedures. CFM operation involves two key elements: Maintenance End Points (MEPs) and Maintenance Intermediate Points (MIPs). MEPs and MIPs are software (or potentially hardware) entities operating within a networking device, such as a data switch, router, or other type of device. MIPs and MEPs can be implemented per networking device, or per communication port within a networking device. CFM requires that MEPs initiate CFM messages and respond to CFM messages. CFM also requires that MIPs receive CFM messages, and respond back to the originating MEP. In the present disclosure, for purposes of explanation, the term "Maintenance Point" will sometimes be used to refer to both MEPs and MIPs.

CFM includes Connectivity Check (CC), Loopback, and Linktrace mechanisms. CFM Loopback and Linktrace messages are used for reactive end-to-end fault management. Proactive connectivity verification is provided by CFM Connectivity Check messages. A Loopback message helps identify a precise fault location along a given Maintenance Association (MA), which is a logical connection between any two MEPs. For example, during a fault isolation operation, a Loopback message may be issued by an MEP to a configured MIP or another MEP. If the MEP or MIP is located in front of the fault, it responds with a Loopback reply. If the MIP is behind the fault it will not respond. For CFM Loopback to work in such a case, the sending MEP must know the MAC (Media Access Control) address of the destination MEP or MIP. This may be accomplished by examining the MEP database, or by any other means of identifying the MAC address of the remote MEP or MIPS port.

The CFM Linktrace message is used by one MEP to trace the path to another MEP or MIP in the same domain. All intermediate MIPs respond back to the originating MEP with a Linktrace reply. After decreasing a time to live (TTL) count by one, intermediate MIPs also forward the Linktrace message until the destination MIP/MEP is reached. If the destination is an MEP, every MIP along a given MA is required to issue a response to the originating MEP. As a result, the originating MEP can determine the MAC address of all MIPs along the MA, and their precise location with respect to the originating MEP. CFM Linktrace frames include a multicast MAC address as a destination address, and include additional TLV (Type Length Value) encoded data indicating the specific target MEP or MIP MAC address. Linktrace frames use the multicast MAC address to reach the next bridge hop along an MA towards the target MEP or MIP specifically indicated in the TLV encoded data. Only the MIPs that lie between the originating MEP and the target MEP, as specified in the TLV data, must respond. Linktrace frames are required to be terminated and regenerated by each bridge along an MA, and processed hop by hop by bridge software.

CFM Connectivity Check (CC) messages are periodic "hello" messages transmitted at a predetermined rate by an MEP within a maintenance association. CC messages are not directed towards any specific MEP. Instead, they are multicast on a regular basis. All MIPs and MEPs in the maintenance domain receive the CC message, but do not respond to it. The receiving MEPs and MIPs use the received CC message to build a connectivity database having entities of the format [MEP DA ("Destination Address"), Port] for each MEP from which a CC message is received. When an MEP receives a CC message, it updates the database, and knows as a result that the maintenance association (MA) with the sender is functional, including all intermediate MIPs. MEPs are configured to expect a predetermined set of MEP SAs. Accordingly, an MEP can compare received CC messages with the expected set and report related failures.

As an example of CC message operation, when there is a failure, such as a link or a fabric failure, there will be a loss of CC frames detected by one or more MEPs. Loss of a CC could be due to link failure, fabric failure, or mis-configuration between two MEPs. If an MEP fails to receive expected CC messages, it issues a trap to the NMS system.

While CFM provides many advantages, the cost of providing CFM functionality may be prohibitive in low cost devices. For example, maintaining the connectivity status of potentially thousands of MEPs based on received CC frame processing may be unfeasible in systems with limited processor and memory capacity. This limitation is apparent in many specific types of networking devices which may be referred to as Customer Premises Equipment (CPE). As it is generally known, CPE devices are communications equipment residing on the customer's premises. As CFM becomes more widely adopted, the expectation will be that its advantages should extend to CPE devices as well as devices located within the network core or backbone. In particular, it would be advantageous to provide CFM support for the data plane between networking devices in a network core and CPE devices attached to those networking devices.

For the above reasons and others, it would be desirable to have a new system for providing CFM support that effectively extends the advantages of CFM operation out from a network core to CPE devices. The new system should advantageously avoid requiring large amounts of CPU and/or memory capacity in the CPE devices in order to support CFM operation.

SUMMARY OF THE INVENTION

To address the above described and other shortcomings of the prior art, a method and system for originating connectivity fault management (CFM) frames on non-CFM aware switches is disclosed. In the disclosed system, an OAM proxy networking device connected to a network core operates with a plurality of associated CPE devices to support CFM out to the CPE devices without requiring that the CPE devices themselves implement CFM. The OAM proxy networking device may be any specific kind of networking device, such as a service aware carrier class switch having bridging capabilities. The OAM proxy networking device is situated between a core Ethernet network and one or more CPE devices, such that all communications between the core Ethernet network and the CPE devices pass through the OAM proxy networking device. Each of the CPE devices provides one or more communication ports through which core Ethernet network services are provided to customers. For example, Virtual Local Area Network (VLAN) services may be provided through the ports of the CPE devices, and in such an embodiment each customer side communication port may define one or more CFM MPs.

To support transmitting CFM connectivity check messages, the OAM proxy networking device maintains one or more connectivity check timers for MPs associated with the CPE devices it is connected to. When a connectivity timer expires for one of the MPs associated with one of the ports in the CPE devices, the OAM proxy networking device forms a CFM connectivity check frame, and transmits the CFM connectivity check frame within a message to that CPE device. Upon receipt of the message, the CFM reads the message to determine an indicated communication port, and checks the operability of the communication port indicated in the message. If the port is operational, the CPE device extracts the CFM connectivity check frame from the received message, and originates the connectivity check frame such that it appears to have been originally generated by and transmitted from the CPE device. The extracted CFM connectivity check frame is transmitted from the CPE device through the OAM proxy networking device into the Ethernet core network. In the event that the indicated port is not operational, the CPE device discards the message received from the OAM proxy networking device without transmitting the CFM connectivity check frame contained therein.

When the OAM proxy networking device receives a CFM Loopback command frame from the Ethernet core network that is addressed to one of the CPE devices to which it is attached, the OAM proxy networking device forms a CFM Loopback reply frame, which it then transmits within a message to the CPE device. The CPE device receives the message from the OAM proxy networking device, and checks the status of a communication port indicated by the message. If the communication port is operational, then the CPE device extracts the Loopback reply frame from the received message, and originates the Loopback reply frame such that it appears to have been originally generated by and transmitted from the CPE device. The extracted Loopback reply frame is transmitted from the CPE device through the OAM proxy networking device into the Ethernet core network. In the event that the indicated port is not operational, the CPE device discards the message received from the OAM proxy networking device without transmitting the CFM Loopback reply contained therein.

When the OAM proxy networking device receives a CFM Linktrace command frame from the Ethernet core network that is addressed to one of the CPE devices to which it is attached, the OAM proxy networking device forms a CFM Linktrace reply frame, which it then transmits within a message to the CPE device. The CPE device receives the message from the OAM proxy networking device, and checks the status of a communication port indicated by the message. If the communication port is operational, then the CPE device extracts the Linktrace reply frame from the received message, and originates the Linktrace reply frame such that it appears to have been originally generated by and transmitted from the CPE device. The extracted Linktrace reply is transmitted from the CPE device through the OAM proxy networking device into the Ethernet core network. In the event that the indicated communication port is not operational, the CPE device discards the message received from the OAM proxy networking device without transmitting the CFM Linktrace reply contained therein.

With regard to CFM Connectivity Check frames received from the Ethernet core for MPs on the CPE devices, the OAM proxy networking device updates an MEP connectivity database it maintains on behalf of the MEPs associated with the CPE devices, and then drops the received frame Connectivity Check frame without forwarding it to any of the CPE devices.

Thus there is disclosed a new system for providing CFM support that effectively extends the advantages of CFM operation out from a network core to CPE devices. The disclosed system advantageously avoids requiring large amounts of CPU and/or memory capacity in the CPE devices to provide the CFM functionality.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
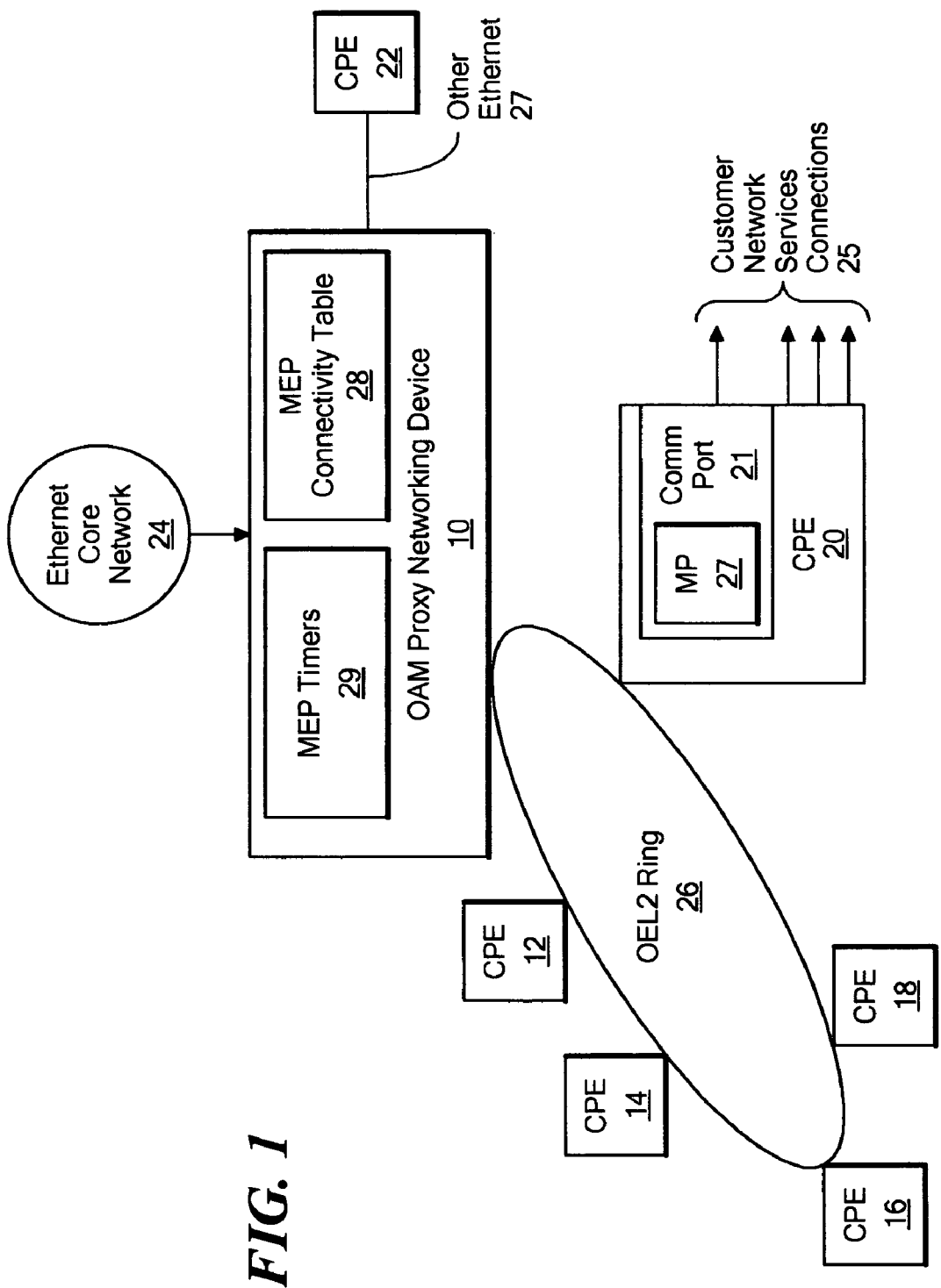
FIG. 1 is a block diagram illustrating components in an embodiment of the disclosed system.

As shown in FIG. 1, an embodiment of the disclosed system operates in an environment including an Operations Administration and Management (OAM) Proxy Networking Device 10, which is located between an Ethernet Core network 24 and a number of Customer Premises Equipment (CPE) devices, shown for purposes of illustration including CPE devices 12, 14, 16, 18, 20 and 22. CPE devices may be connected to the OAM Proxy Networking Device 10 through a variety of specific Ethernet connections, illustrated by the Optical Ethernet Layer 2 (OEL2) ring 26 connecting CPE devices 12, 14, 16, 18 and 20 to the OEM Proxy Networking Device 10, and the non-ring Ethernet connection 27 through which CPE device 22 is connected to the OEM Proxy Networking Device 10. The Ethernet core 24 that is connected to the OAM Proxy Networking Device 10 may consist of any specific type of appropriate Ethernet backbone network technology.

The OAM Proxy Networking Device 10 may provide a variety of specific types of networking functions, including, but not limited to, bridging, routing, and/or switching functions. For example, the OAM Proxy Networking Device 10 may be embodied to include IEEE 802.1q compliant bridge technology. The OAM Proxy Networking Device 10 may, for example, consist of a carrier-owned networking device including one or more processors, program code logic, and/or hardware or firmware logic operable to support various specific bridging, routing and switching operations.

The CPE devices 12, 14, 16, 18, 20 and 22 may be any specific type of communication device that is deployed by a carrier service provider for a customer or end user to connect to in order to obtain network services provided by the carrier service provider. For example, the CPE devices 12, 14, 16, 18, 20 and 22 may be carrier equipment deployed on customer premises to give the customer one or more RJ-45 connections or the like through which Ethernet-based communication and networking services are provided from the carrier to the customer. Each of the CPE devices 12, 14, 16, 18, 20 and 22 may include one or more CFM Maintenance Points, which may be Maintenance End Points (MEPs) or Maintenance Intermediate Points (MIPs), for which Connectivity Fault Management (CFM) operations must be supported. In particular, each of the CPE devices 12, 14, 16, 18, 20 and 22 may include one or more MPs associated with each communication port they contain. The CPE devices 12, 14, 16, 18, 20 and 22 may be carrier-owned devices located at the dividing point between the carrier organization and network services customers. The CPE devices 12, 14, 16, 18, 20 and 22 may accordingly include various specific types of communication ports that enable customers to connect their networking devices. The CPE devices 12, 14, 16, 18, 20 and 22 may each include one or more processors, program code logic, and/or hardware or firmware logic operable to move data between the customers or other end users and the Ethernet Core 24 through the OAM Proxy Networking Device 10.

For purposes of illustration, the CPE device 20 is shown including a communication port 21 providing one of a number of Customer Network Services Connections 25, such as RJ-45 connections or the like through which are obtained one or more network services. The MP 21 is associated with the communication port 21.

During operation of the embodiment shown in FIG. 1, the OAM Proxy Networking Device 10 processes CFM Loopback messages and CFM Linktrace messages received from the Ethernet Core 24 that are addressed to the CPE devices 12, 14, 16, 18, 20 and 22. For example, each such CFM Loopback and Linktrace messages may include a unicast or multicast Media Access Control (MAC) destination address of one of the CPE devices 12, 14, 16, 18, 20, and 22. The OAM Proxy Networking Device 10 processes these received CFM Loopback messages and CFM Linktrace messages by constructing CFM Loopback replies and CFM Linktrace replies respectively. The OAM Proxy Networking Device 10 creates messages containing the CFM Loopback replies and CFM Linktrace replies, and transmits these messages to the CPE devices indicated by the corresponding CFM Loopback messages and CFM Linktrace messages. The OAM Proxy Networking Device 10 then discards the received CFM Loopback and Linktrace messages. When the CPE devices 12, 14, 16, 18, 20 and 22 receive the messages containing the CFM Loopback and CFM Linktrace replies, they check the communication ports indicated by the messages. If the indicated communication port in a receiving CPE device is operational, then the receiving CPE device extracts the CFM Loopback or Linktrace reply frame from within the received message, and originates the frame such that it appears to have been created by and transmitted from the receiving CPE device. For example, the CFM Loopback reply and CFM Linktrace reply frames originated by the CPE device may include a source MAC address of the CPE device, whereas the messages sent from the OAM Proxy Networking Device 10 may have source MAC addresses of the OAM Proxy Networking Device 10.

Further during operation of the embodiment of FIG. 1, the OAM Proxy Networking Device 10 receives CFM Connectivity Check messages from the Ethernet Core 24 that are addressed to the CPE devices 12, 14, 16, 18, 20 and 22. For example, such CFM Connectivity Check messages may include multicast MAC destination addresses associate with one or more of the CPE devices 12, 14, 16, 18, 20 and 22. The OAM Proxy Networking Device 10 updates the MEP Connectivity Table 28 based on the received CFM Connectivity Check messages, and does not forward the received CFM Connectivity Check messages to the CPE devices 12, 14, 16, 18, 20, and 22. The OAM Proxy Networking Device 10 also maintains CFM Connectivity Check timers 29 corresponding to each of the MEPs located in the CPE devices 12, 14, 16, 18, 20 and 22. When one of the CFM Connectivity Check timers 29 expires, the OAM Proxy Networking Device 10 sends a message encapsulating a CFM Connectivity Check frame to the CPE device containing the corresponding MEP. If the communication port corresponding to the MEP is operational, the receiving CPE device then extracts the CFM Connectivity Check frame from the message and originates the frame such that it appears to have been created by and transmitted from the receiving CPE device. For example, the CFM Connectivity Check frames originated by the CPE device may include a source MAC address of the CPE device, whereas the messages sent from the OAM Proxy Networking Device 10 may have source MAC addresses of the OAM Proxy Networking Device 10.

A CFM frame that is originated by one of the CPE devices 12, 14, 16, 18, 20, and 22 in response to receipt of a message containing a CFM frames transmitted from the OAM Proxy Networking Device 10 is transmitted back to the OAM Proxy Networking Device 10 through a communication port that is different from the communication port that is checked for operability in response to receipt that message from the OAM Proxy Networking Device 10. For example, the communication port that is checked for operability by the receiving CPE device 20 may be one of the communication ports providing the Customer Network Services Connections 25, such as communication port 21, while the CFM frame extracted from the received message by the CPE device 20 is transmitted through a different communication port of the CPE device 20 that is coupled to the OEL2 Ring 26, providing a connection from the CPE device 20 to the OAM Proxy Networking Device 10.

Figure 2:
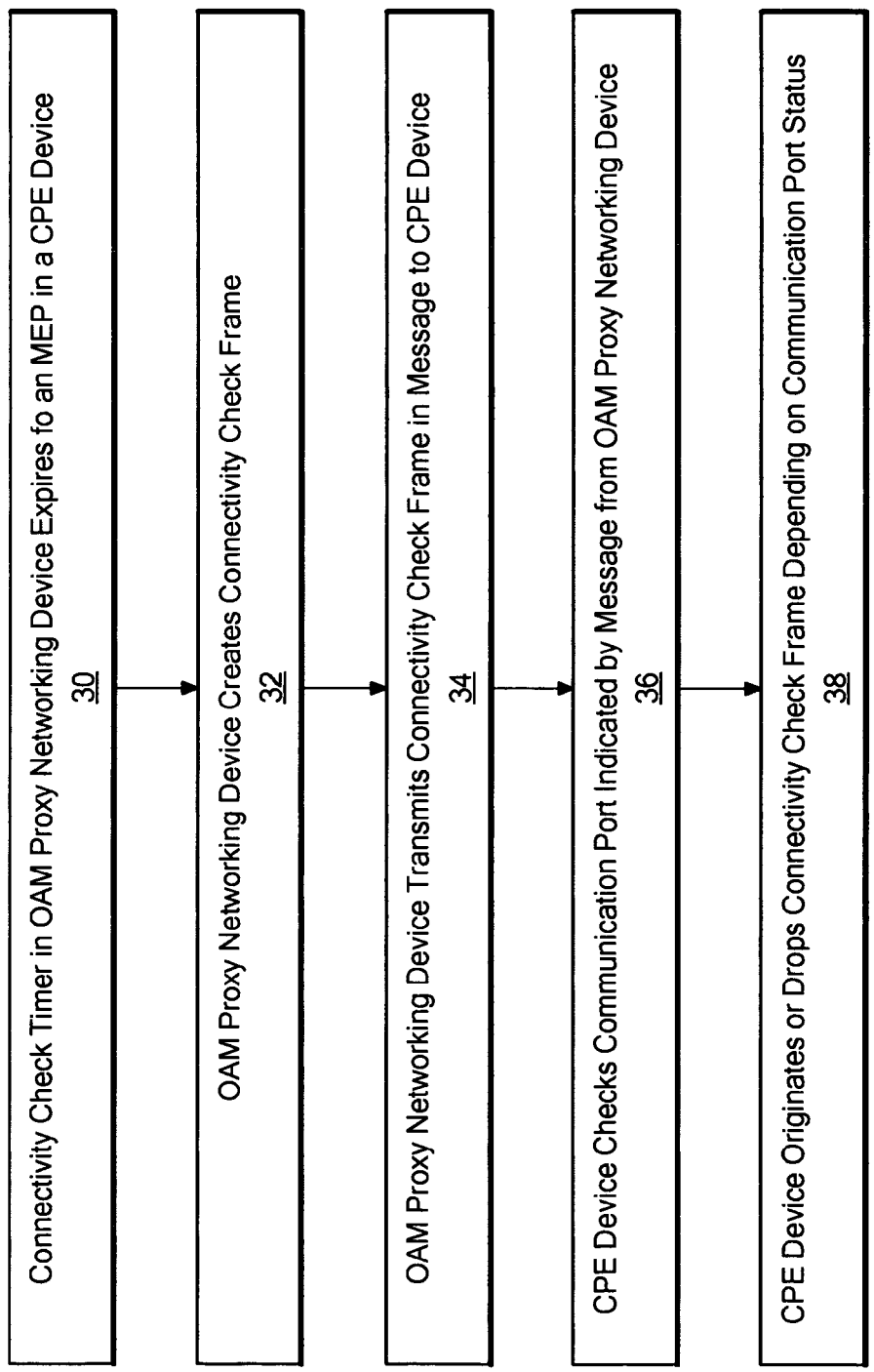
FIG. 2 is a flow chart showing steps performed in an illustrative embodiment to originate Connectivity Check frames from CPE devices.

FIG. 2 is a flow chart illustrating steps performed by an embodiment of the disclosed system to originate CFM Connectivity Check frames from CPE devices that are attached to an OAM Proxy Networking Device. At step 30, a Connectivity Check timer corresponding to an MEP in a CPE device expires in the OAM Proxy Networking Device. At step 32, the OAM Proxy Networking Device creates a CFM Connectivity Check frame indicating that the MEP in the CPE device is operational. The OAM Proxy Networking Device then forms a message at step 34 that includes the CFM Connectivity Check frame, and transmits the message to the CPE that includes the MEP corresponding to the timer that expired at step 30. For example, the CFM Connectivity Check frame may be a Layer 2 frame that is encapsulated by the OAM Proxy Networking Device within the payload of a higher layer message that is part of a higher layer communication protocol between the OAM Proxy Networking Device and the CPE devices. An indication of a communication port to be checked within the CPE device is also contained within the message formed at step 34. The indication of the communication port to be checked within the CPE device may, for example, be located outside of the encapsulated CFM Connectivity Check frame in the message payload.

When the CPE device receives the message transmitted at step 34, at step 36 the CPE device checks the status of the communication port that indicated by the received message. For example, at step 36, the receiving CPE device may check a control status register including one or more bits indicating the operability of the communication port. At step 38, in the event that the communication port is determined to be currently operable, then the CPE device extracts the CFM Connectivity Check frame from the received message and originates it. The CPE device originates the extracted CFM Connectivity Check frame by transmitting it through the OAM Proxy Networking Device to the Ethernet Core network. In the event that the communication port indicated in the received message is not operable, then the receiving CPE device discards the received message without originating the CFM Connectivity Check frame contained in the message.

Figure 3:
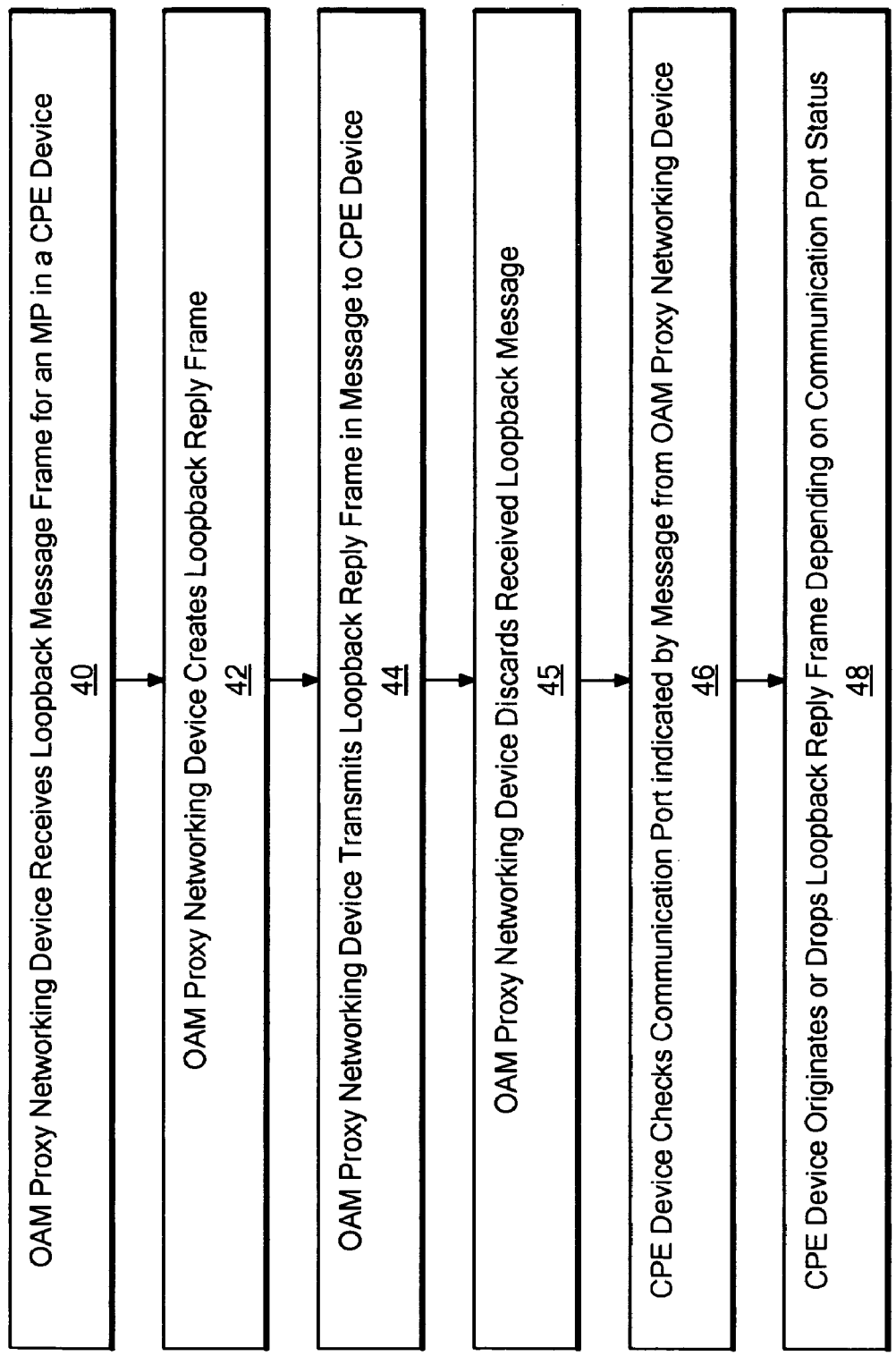
FIG. 3 is a flow chart showing steps performed in an illustrative embodiment to originate Loopback reply frames from CPE devices.

FIG. 3 is a flow chart illustrating steps performed by an embodiment of the disclosed system to originate CFM Loopback reply frames. At step 40, the OAM Proxy Networking Device receives a CFM Loopback message frame destined for an MP on a CPE device to which it is connected. For example, a CFM Loopback message destined for an MP on a CPE device connected to the OAM Proxy Networking Device may have a destination MAC address of that CPE device. At step 42, the OAM Proxy Networking Device generates a Loopback reply frame. The OAM Proxy Networking Device then forms a message including the CFM Loopback reply frame generated at step 42 and transmits the message to the CPE device at step 44. For example, the CFM Loopback reply frame may be a Layer 2 frame that is encapsulated within the payload of a higher layer message that is part of a higher layer communication protocol between the OAM Proxy Networking Device and the CPE devices. An indication of the communication port to be checked within the CPE device is also contained within the message transmitted at step 44, for example, external to the encapsulated CFM Loopback reply frame in the message payload. At step 45, the OAM Proxy Networking Device discards the Loopback message received at step 40.

When the CPE device receives the message transmitted at step 44, at step 46 the CPE device checks the status of the communication port that indicated by the received message. For example, at step 46, the receiving CPE device may check a control status register including one or more bits indicating the operability of the communication port. At step 48, in the event that the communication port is determined to be currently operable, then the CPE device extracts the CFM Loopback reply frame from the received message and originates it. The CPE device originates the extracted CFM Loopback reply frame by transmitting it through the OAM Proxy Networking Device to the Ethernet Core network. In the event that the communication port indicated in the received message is not operable, then the receiving CPE device discards the received message without originating the CFM Loopback reply frame contained in the message.

Figure 4:
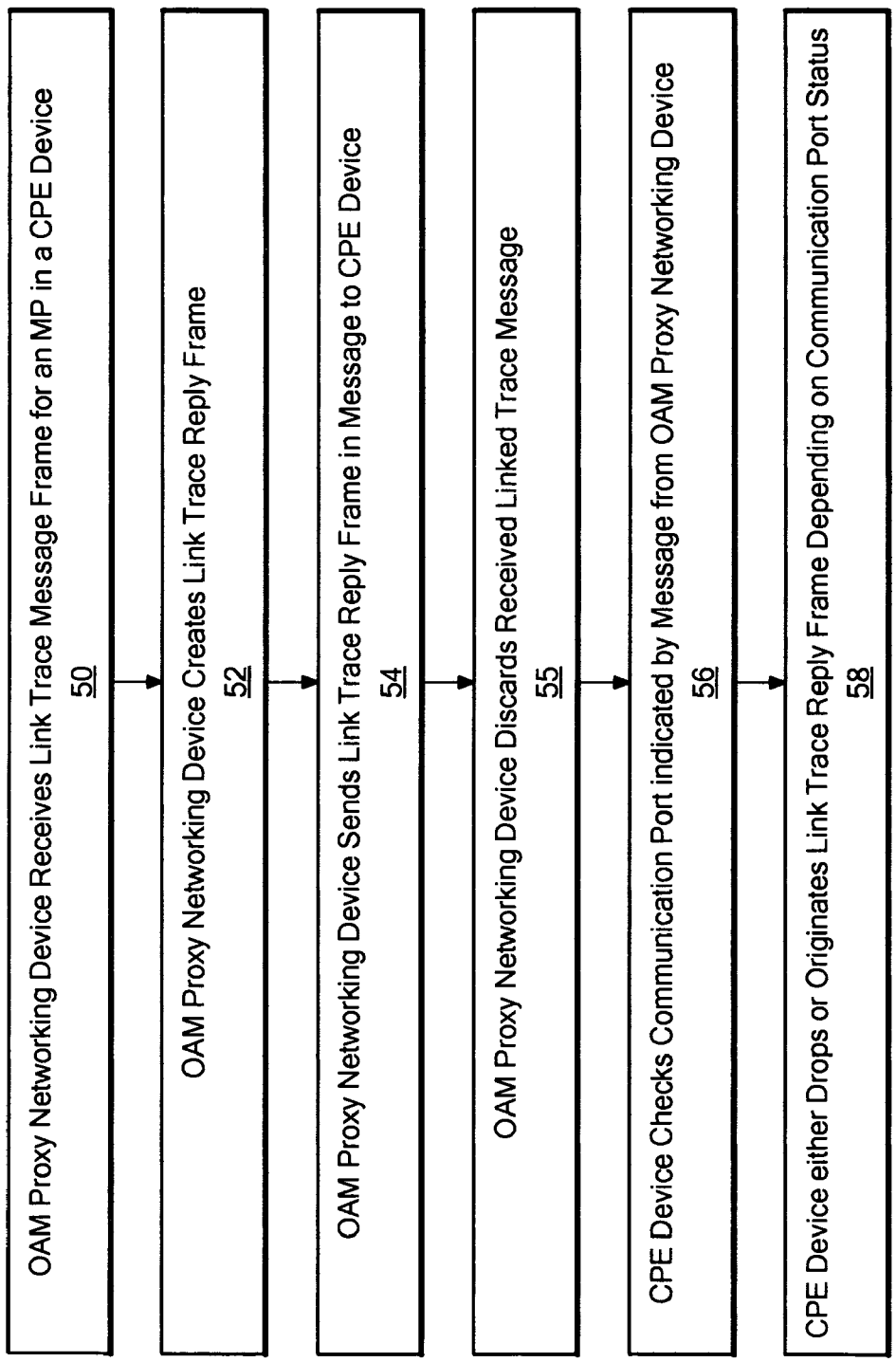
FIG. 4 is a flow chart showing steps performed in an illustrative embodiment to originate Linktrace reply frames from CPE devices.

FIG. 4 is a flow chart illustrating steps performed by an embodiment of the disclosed system to originate CFM Linktrace reply frames. At step 50, the OAM Proxy Networking Device receives a CFM Linktrace message frame destined for an MP on a CPE device to which it is connected. For example, a CFM Linktrace message destined for an MP on a CPE device connected to the OAM Proxy Networking Device may have a multicast destination MAC address associated with that CPE device. At step 52, the OAM Proxy Networking Device generates a Linktrace reply frame. The OAM Proxy Networking Device then forms a message including the CFM Linktrace reply frame generated at step 52 and transmits the message to the CPE device at step 54. For example, the CFM Linktrace reply frame may be a Layer 2 frame that is encapsulated within the payload of a higher layer message that is part of a higher layer communication protocol between the OAM Proxy Networking Device and the CPE devices. An indication of the communication port to be checked within the CPE device is also contained within the message transmitted at step 44, for example, external to the encapsulated CFM Linktrace reply frame in the message payload. At step 55, the OAM Proxy Networking Device discards the Linktrace message received at step 50.

When the CPE device receives the message transmitted at step 54, at step 56 the CPE device checks the status of the communication port that indicated by the received message. For example, at step 56, the receiving CPE device may check a control status register including one or more bits indicating the operability of the communication port. At step 58, in the event that the communication port is determined to be currently operable, then the CPE device extracts the CFM Linktrace reply frame from the received message and originates it. The CPE device originates the extracted CFM Linktrace reply frame by transmitting it through the OAM Proxy Networking Device to the Ethernet Core network. In the event that the communication port indicated in the received message is not operable, then the receiving CPE device discards the received message without originating the CFM Linktrace reply frame contained in the message.

Figure 5:
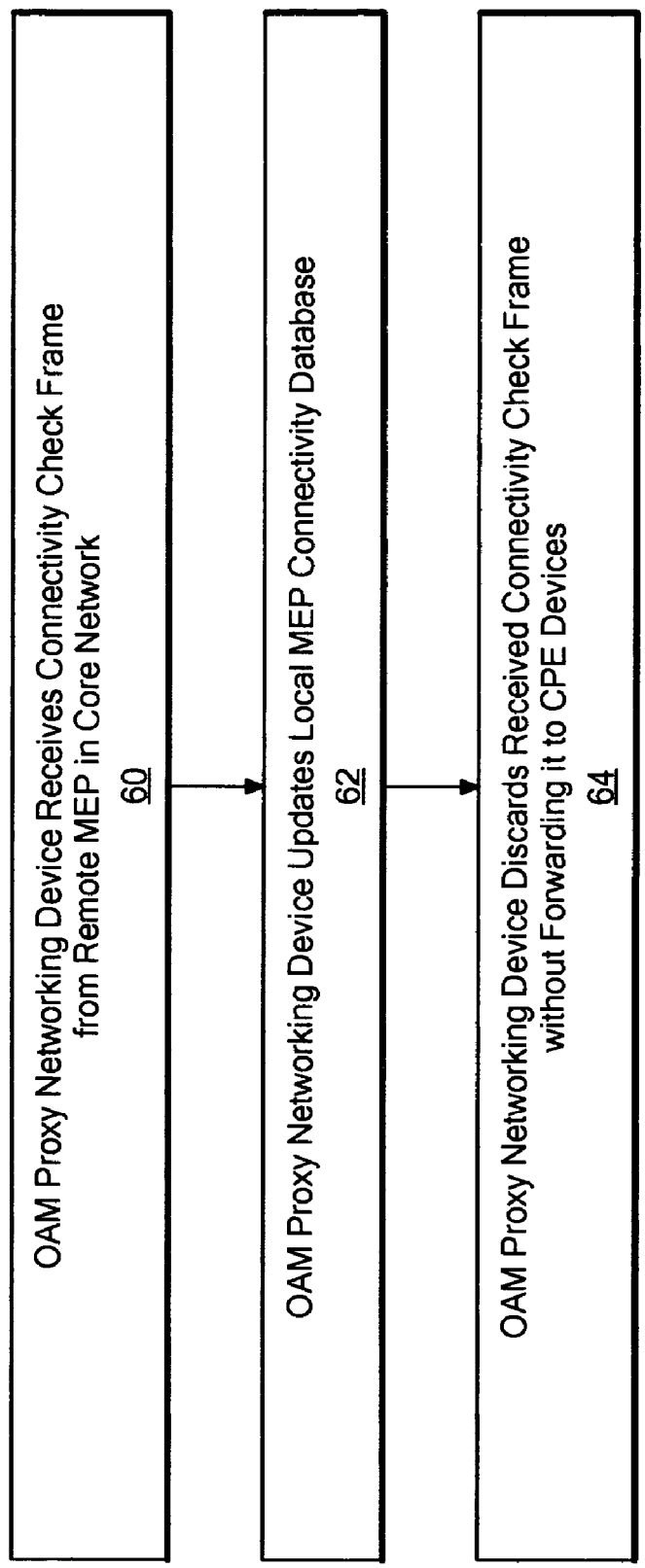
FIG. 5 is a flow chart showing steps performed in an illustrative embodiment to process received connectivity check frames on behalf of connected CPE devices.

FIG. 5 is a flow chart showing steps performed in an illustrative embodiment to process received connectivity check frames on behalf of connected CPE devices. As shown in FIG. 5, at step 60, the OAM Proxy Networking Device receives a CFM Connectivity Check frame from a remote MEP located in a core Ethernet network to which it is connected. The CFM Connectivity Check frame received at step 60 includes a destination multicast MAC address that is associated with at least one of the CPE devices also connected to the CPE device. At step 62, the OAM Proxy Networking Device updates a local MEP connectivity database stored on the OAM Proxy Networking Device on behalf of the MPs in the CPE devices to which it is connected. For example, each of the database entries in the MEP connectivity database has the format [MEP DA, Port], and indicates that the remote MEP associated with a destination address of "MEP DA", from which the CFM Connectivity Check frame was received at step 60, is currently accessible through the communication port "Port". For example, the communication port represented by "Port" may be the communication port of the OAM Proxy Networking Device through which the CFM Connectivity Check frame was received at step 60, and the MEP DA may be equal to a source address contained in the CFM Connectivity Check frame that was received at step 60. At step 64, the OAM Proxy Networking Device discards the received CFM Connectivity Check frame without forwarding it to the CPE device to which it was addressed.

FIGS. 1 through 5 are block diagram and flowchart illustrations of methods, apparatus(s) and computer program products according to an embodiment of the invention. It will be understood that each block of FIGS. 1 through 5, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A method for providing connectivity fault management, comprising:
    detecting, by a management proxy networking device having at least one processor, a connectivity fault management trigger event for a maintenance point associated with a communication port on a customer premises equipment device connected to said management proxy networking device;
    generating, by said management proxy networking device, responsive to said connectivity fault management trigger event, a connectivity fault management frame;
    transmitting, to said customer premises equipment device from said management proxy networking device, a message containing said connectivity fault management frame generated by said management proxy networking device, said message also indicating said communication port;
    determining, by said customer premises equipment device responsive to receipt of said message from said management proxy networking device and said indication of said communication port in said message, whether said communication port is operable; and
    originating, by said customer premises equipment device responsive to receipt of said message from said management proxy networking device and a determination that said communication port is operable, said connectivity fault management frame from said customer premises equipment device, wherein said originating includes extracting said connectivity fault management frame from said message received from said management proxy networking device and transmitting said connectivity fault management frame from said customer premises equipment through said management proxy networking device into a core network connected to said management proxy networking device.

2. The method of claim 1, wherein said connectivity fault management trigger event comprises an expiration of a timer associated with said maintenance point, wherein said timer is located on said management proxy networking device, and wherein said connectivity fault management frame comprises a connectivity check frame.

3. The method of claim 2, further comprising:
    receiving a connectivity check frame for said maintenance point at said management proxy networking device; and
    updating, responsive to said connectivity check frame, a maintenance end point connectivity database to indicate the reachability of a maintenance end point that originated said connectivity check frame.

4. The method of claim 1, wherein said connectivity fault management trigger event comprises receipt of a loopback request frame for said maintenance point by said management proxy networking device, and wherein said connectivity fault management frame comprises a loopback reply frame.

5. The method of claim 1, wherein said connectivity fault management trigger event comprises receipt of a Linktrace request frame for said maintenance point by said management proxy networking device, and wherein said connectivity fault management frame comprises a Linktrace reply frame.

6. The method of claim 1, wherein said maintenance point comprises a maintenance end point.

7. The method of claim 1, wherein said maintenance point comprises a maintenance intermediate point.

8. A system for providing connectivity fault management, comprising:
    a management proxy networking device including at least one processor, configured to detect a connectivity fault management trigger event for a maintenance point associated with a communication port on a customer premises equipment device connected to said management proxy networking device;
    said management proxy networking device further configured to generate, responsive to said connectivity fault management trigger event, a connectivity fault management frame;
    said management proxy networking device further configured to transmit a message to said customer premises equipment device from said management proxy networking device, said message containing said connectivity fault management frame generated by said management proxy networking device, said message also indicating said communication port;
    said customer premises equipment device configured to determine, responsive to receipt of said message from said management proxy networking device and said indication of said communication port in said message, whether said communication port is operable; and
    said customer premises equipment device further configured to originate, responsive to receipt of said message from said management proxy networking device and a determination that said communication port is operable, said connectivity fault management frame from said customer premises equipment device, at least in part by extracting said connectivity fault management frame from said message received from said management proxy networking device and transmitting said connectivity fault management frame from said customer premises equipment through said management proxy networking device into a core network connected to said management proxy networking device.

9. The system of claim 8, wherein said connectivity fault management trigger event comprises an expiration of a timer associated with said maintenance point, wherein said timer is located on said management proxy networking device, and wherein said connectivity fault management frame comprises a connectivity check frame.

10. The system of claim 9, further comprising:
said management proxy networking device further configured to receive a connectivity check frame for said maintenance point at said management proxy networking device; and
said management proxy networking device further configured to update, responsive to said connectivity check frame, a maintenance end point connectivity database to indicate the reachability of a maintenance end point that originated said connectivity check frame.

11. The system of claim 8, wherein said connectivity fault management trigger event comprises receipt of a loopback request frame for said maintenance point by said management proxy networking device, and wherein said connectivity fault management frame comprises a loopback reply frame.

12. The system of claim 8, wherein said connectivity fault management trigger event comprises receipt of a Linktrace request frame for said maintenance point by said management proxy networking device, and wherein said connectivity fault management frame comprises a Linktrace reply frame.

13. The system of claim 8, wherein said maintenance point comprises a maintenance end point.

14. The system of claim 8, wherein said maintenance point comprises a maintenance intermediate point.

15. A computer program product having a non-transitory computer readable storage medium, said computer readable storage medium have program code for providing connectivity fault management stored thereon, said program code comprising:
program code for detecting, in a management proxy networking device including at least one processor, a connectivity fault management trigger event for a maintenance point associated with a communication port on a customer premises equipment device connected to said management proxy networking device;
program code for generating, by said management proxy networking device, responsive to said connectivity fault management trigger event, a connectivity fault management frame;
program code for transmitting, to said customer premises equipment device from said management proxy networking device, a message containing connectivity fault management frame generated by said management proxy networking device, said message also indicating said communication port;
program code for determining, by said customer premises equipment device responsive to receipt of said message from said management proxy networking device and said indication of said communication port in said message, whether said communication port is operable; and
program code for originating, by said customer premises equipment device responsive to receipt of said message from said management proxy networking device and a determination that said communication port is operable, said connectivity fault management frame from said customer premises equipment device, wherein said originating includes extracting said connectivity fault management frame from said message received from said management proxy networking device and transmitting said connectivity fault management frame from said customer premises equipment through said management proxy networking device into a core network connected to said management proxy networking device.

16. A system for providing connectivity fault management, comprising:
at least one processor communicably coupled to at least one memory storing program code executable on said processor to provide connectivity fault management, said program code comprising:
program code for detecting, in a management proxy networking device including at least one processor, a connectivity fault management trigger event for a maintenance point associated with a communication port on a customer premises equipment device connected to said management proxy networking device;
program code for generating, by said management proxy networking device, responsive to said connectivity fault management trigger event, a connectivity fault management frame; and
program code for transmitting, to said customer premises equipment device from said management proxy networking device, a message containing connectivity fault management frame generated by said management proxy networking device, said message also indicating said communication port;
program code for determining, by said customer premises equipment device responsive to receipt of said message from said management proxy networking device and said indication of said communication port in said message, whether said communication port is operable; and
program code for originating, by said customer premises equipment device responsive to receipt of said message from said management proxy networking device and a determination that said communication port is operable, said connectivity fault management frame from said customer premises equipment device, wherein said originating includes extracting said connectivity fault management frame from said message received from said management proxy networking device and transmitting said connectivity fault management frame from said customer premises equipment through said management proxy networking device into a core network connected to said management proxy networking device.

* * * * *